(12) United States Patent
Osborn (10) Patent No.: US 7,050,807 B1
(45) Date of Patent: May 23, 2006

(54) HARDWARE RESOURCE IDENTIFIER FOR SOFTWARE-DEFINED COMMUNICATIONS SYSTEM

(75) Inventor: Gregory Ralph Osborn, Chandler, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 910 days.

(21) Appl. No.: 09/592,230

(22) Filed: Jun. 12, 2000

(51) Int. Cl.
    *H04Q 7/20* (2006.01)

(52) U.S. Cl. .................. 455/445; 455/450; 455/464; 455/517; 370/329

(58) Field of Classification Search ............ 455/63.1, 455/423, 424, 425, 450, 451, 452.1, 67.11, 455/414.1, 445, 517, 464; 370/329
See application file for complete search history.

(56) References Cited

U.S. PATENT DOCUMENTS

| | | | | |
|---|---|---|---|---|
| 5,230,078 A | * | 7/1993 | Varela et al. ............ 455/67.11 |
| 5,479,477 A | * | 12/1995 | McVey et al. ............... 455/508 |
| 5,842,015 A | * | 11/1998 | Cunniff et al. ............... 395/674 |
| 6,295,491 B1 | * | 9/2001 | Ayoub et al. ................. 701/33 |
| 6,332,023 B1 | | 12/2001 | Porter et al. ................ 379/242 |
| 6,333,936 B1 | | 12/2001 | Johansson et al. .......... 370/449 |
| 6,370,381 B1 | * | 4/2002 | Minnick et al. ............. 455/445 |
| 6,385,434 B1 | * | 5/2002 | Chuprun et al. ........... 455/11.1 |
| 6,493,354 B1 | * | 12/2002 | Hansquine et al. ......... 370/468 |

\* cited by examiner

*Primary Examiner*—Stephen D'Agosta
(74) *Attorney, Agent, or Firm*—Jenner & Block LLP (57) ABSTRACT

A hardware resource identifier (19) recognizes hardware resource dependencies in a multi-channel communications system. Initially, system communications domains (D1–D4) in which system hardware resources are located are identified. Next, managed hardware resources, hardware resource groups and hardware resource group boundaries among the system hardware resources are identified. Association labels are then assigned to the system hardware resources to identify relationships, if any, between the system hardware resources and external hardware, to discern redundant resources within respective ones of the hardware resource groups, and to characterize dedicated coupling between individual ones of the system hardware resources. An abstract resource specification (78) is then interpreted to locate available system hardware resources, as organized into the system identified communications domains and the identified hardware resource groups, to enable maximum preservation of most functional and least available hardware resources during hardware resource allocation.

10 Claims, 8 Drawing Sheets

DECREASING
CHANNELIZATION
INCREASING
FLEXIBILITY

HARDWARE RESOURCE IDENTIFIER FOR SOFTWARE-DEFINED COMMUNICATIONS SYSTEM

BACKGROUND OF THE INVENTION

1. Field of the Invention

The present invention relates generally to open architecture software-defined systems, and particularly to the identification of system hardware resources and resource interdependencies in a manner that enables the resources to be efficiently allocated to system applications.

2. Description of Related Art

A conventional software-defined communications system includes several reconfigurable groups of hardware components, often referred to as hardware resources, that are utilized in various combinations to create system hardware topologies. These hardware resources can be allocated to specific system applications in a manner that minimizes unnecessary hardware resource redundancy.

While each of the hardware resources in the software-defined communications system is ideally completely independent from all other hardware resources, most hardware resources typically have some degree of what is referred to as resource channelization, which is the hardwired connectivity between system resources that constrains resource allocation during the concurrent operation of multiple system applications. For example, a fully channelized system may contain hardware components that are divided into separate channels of duplicate hardware resources, with each channel being capable of supporting one application at a time. However, resources from one channel cannot be utilized with resources from another separate channel due to hardwired dependencies within respective resources. Further, a partially channelized system enables a larger degree of flexibility with respect to resource allocation compared to a fully channelized system.

Existing resource allocation techniques are typically capable of assigning hardware resources to fixed channels, even though the resources within these fixed channels are capable of being partitioned into smaller channel subsets. Conventional techniques use such a fixed channel approach due to the complexity involved in describing and honoring allowable combinations of resources. While such techniques have produced acceptable results in the past, a more efficient technique for allocating hardware resources is needed for the increasingly complex software-defined multi-channel reconfigurable radios that are now commercially available.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
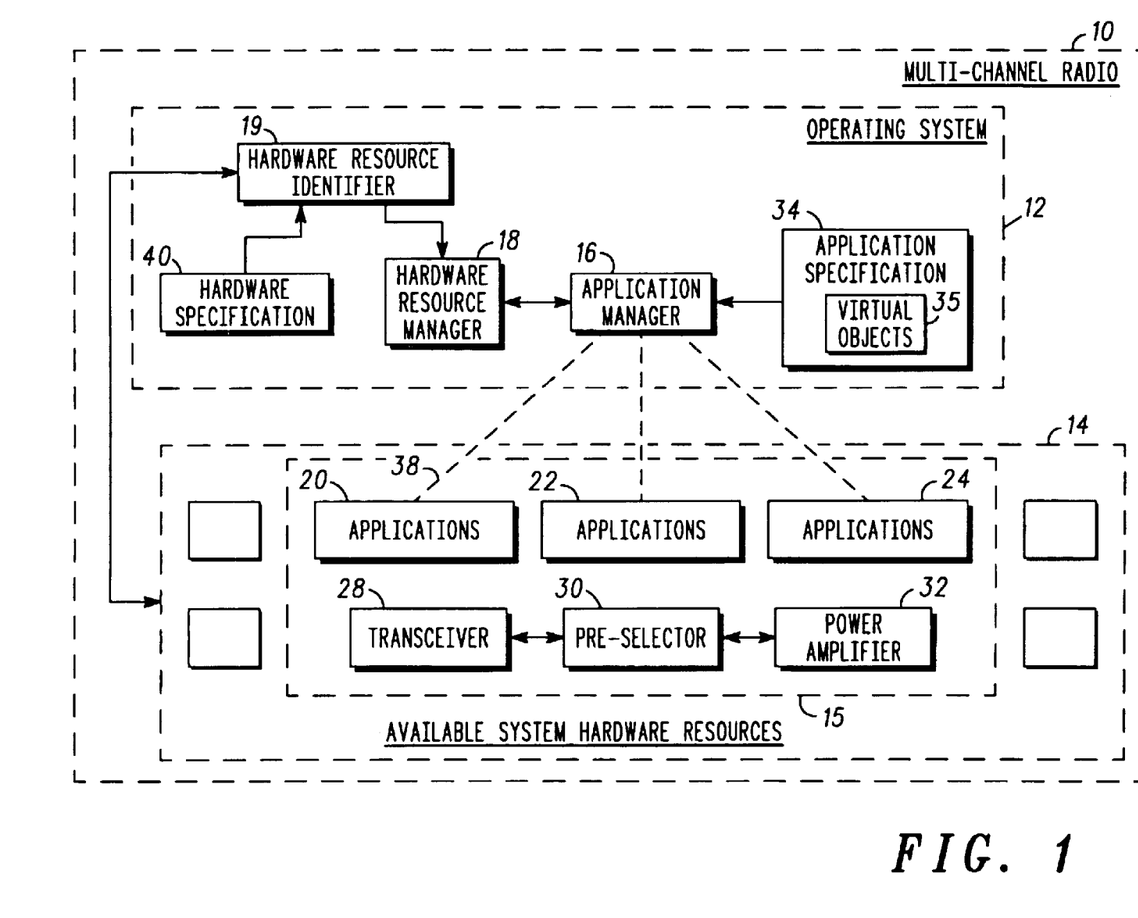
FIG. 1 is a block diagram of the hardware and software components in a software-defined communications system incorporating the hardware resource identifier of the present invention.

Referring now to the drawings in which like numerals represent like parts, FIG. 1 is a block diagram of an exemplary system architecture for a multi-channel radio 10 of the type in which the present invention is implemented. Preferably, the system architecture is that of a wireless information transfer (WITS) radio that is manufactured and sold by Motorola Corporation, the assignee of the present invention, and that includes a system platform, or operating system, 12 and available system resources 14. The system platform 12 is part of the infrastructure of the radio 10, and includes an application manager 16 and a hardware resource manager 18, both of which are implemented via pre-loaded operating system software. The hardware resource manager 18 also includes a hardware resource identifier 19 that is responsible for identifying and tracking constraints of and interdependencies among the available hardware resources 14 to enable the hardware resource manager 18 to efficiently allocate the available hardware resources 14 to system applications.

The available hardware resources 14 include resources such as, for example, PPC processors, Sharc processors, FPGAs, DSPs, and the like, as well as other hardware resources required by the radio 10 to execute system applications. A group of hardware resources 15, referred to as allocated resources and represented in FIG. 1 by exemplary system processors 20, 22, 24 as well as a transceiver 28, a selector 30 and a power amplifier 32, is selected from the available hardware resources 14 for use in executing an application.

The application manager 16 is responsible for executing a system application, typically in response to an operator-initiated event, based on a stored application specification 34 that is associated with the application. The application specification 34 contains application object descriptions, known as virtual objects, 35 required hardware resource information and software object to hardware processor mapping information that application developers need to guarantee correct operation of system applications, and serves as common language among applications, the application manager 16 and the hardware resource manager 18 for specifying required and available resources during system resource allocation. The application manager 16 retrieves software objects 36 required to run the application from an application object library 37 (FIG. 2) based on the virtual objects 35, and loads the objects 36 onto the hardware processors 20, 22, 24 through a mapping function represented generally at 38 based on hardware resource allocation information provided by the hardware resource manager 18 and facilitated by the hardware resource identifier 19.

The hardware resource manager 18 is responsible for allocating hardware resources to system applications so that the least available and most functional of the available hardware resources 14 are not allocated until all options for using more available and/or less functional hardware resources for an application are exhausted. Details as to how the hardware resource manager 18 allocates hardware resources are given in co-pending application Ser. No. 09/586,120 entitled Dynamic Hardware Resource Manager For Software-Defined Communications System, assigned to Motorola Corporation and incorporated herein by reference. The hardware resource manager 18 allocates hardware resources to an application based on characteristics, or attributes, of available hardware resource such as, for example, resource capabilities, name, type, flavor, shared, version, and address characteristics stored in a hardware specification maintained on the system platform 12 and updated as hardware resources are added or removed, as well as on configuration characteristics tracked and generated by a hardware resource identifier 19. The hardware resource identifier 19 of the present invention then uses this characteristic hardware resource information to generate a hardware specification, graphically illustrated as an abstract resource specification (78 in FIG. 2), that identifies hardware resource constraints and interdependencies and that is used by the hardware resource manager 18 to designate certain of the resources 14 as allocated resources 15.

Figure 2:
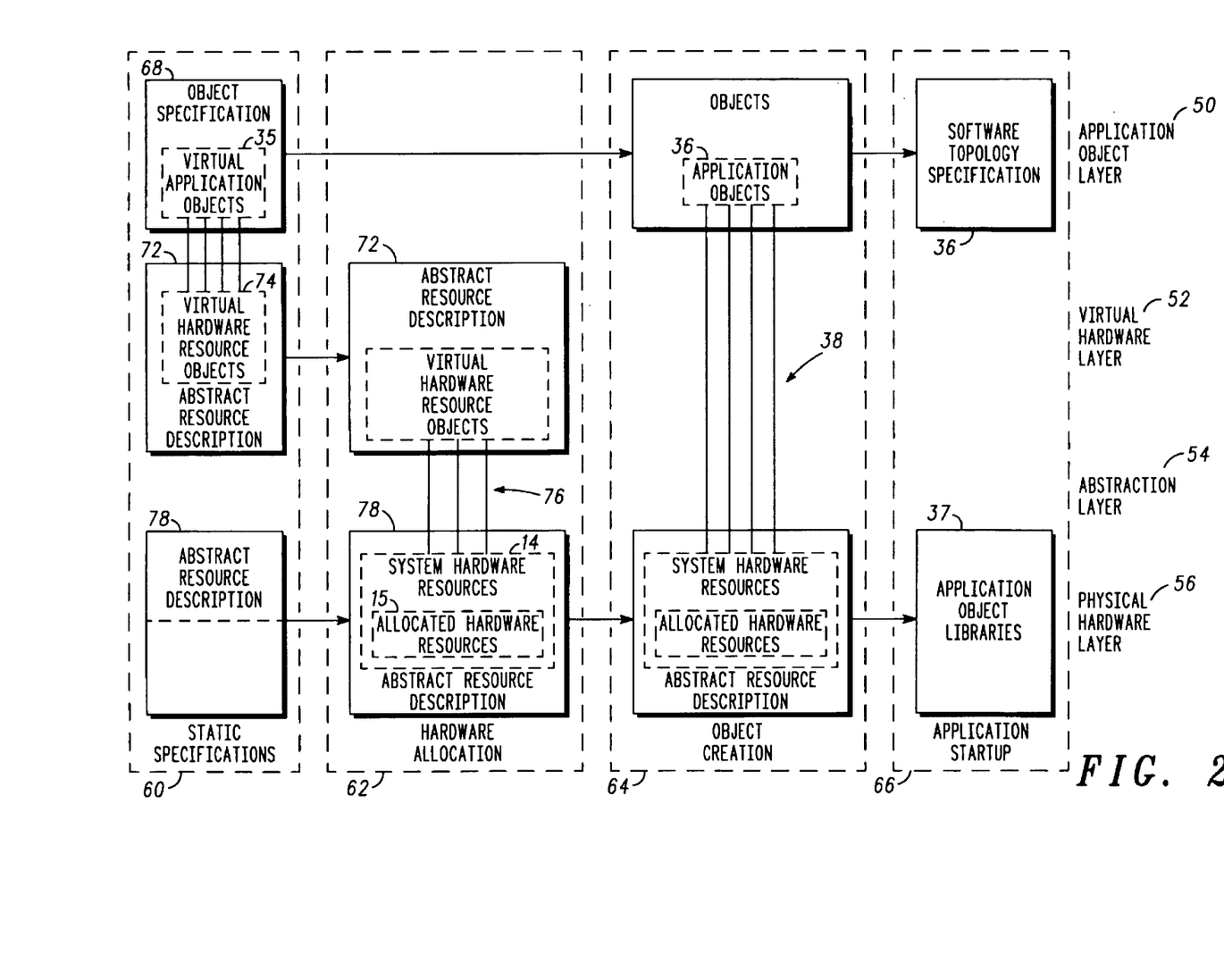
FIG. 2 is a block diagram showing the topology of and interaction among a hardware resource manager, application manager and hardware resource identifier shown in FIG. 1.

FIG. 2 is a more detailed block diagram of the topology of the system architecture of the multi-channel software-defined radio 10 shown in FIG. 1. As shown, the architecture includes several functional layers, including an application object layer 50, a virtual hardware layer 52, an abstraction layer 54 and a physical hardware layer 56, as well as several application management stages, including a static specification stage 60, a hardware allocation stage 62, an object creation stage 64 and an application startup stage 66. The functional layers 50–56 operate to load the application objects 36 onto the allocated hardware resources 15 based on the application specification 34, as well as the composite hardware specification provided by the hardware resource identifier 19 based on its processing of the static system hardware specification 40 provided with the system as well as its processing of the dynamic hardware discovery results.

From information provided in the application specification 34, the application manager 16 also creates an abstract resource description 72 including virtual hardware resource objects 74 which identify application hardware requirements, and which are transmitted to the hardware resource manager 18 and mapped at 76 in the abstraction layer 54 to the available system hardware resources 14, based on the hardware resource interdependency data in the abstract resource specification 78 generated by the hardware resource identifier 19 of the present invention, to create the allocated hardware resources 15 (the object specification 68, the abstract resource description 72 and all other specifications necessary to define an application are subsets of the application specification 34). The objects 36 are then loaded onto the allocated hardware resources 15 through the abstraction layer 54 at 38 to run the requesting application. The hardware resource identifier 19 applies hardware resource constraints and interdependencies as represented generally by the arrows 76 in the static specification stage 60 by interpreting the abstract hardware resource description 72 to enable the available hardware resources 14 to be effectively allocated by the hardware resource manager of the present invention.

The application object layer 50 includes the virtual application objects 35, which are in an object specification 68 and which identify software application objects 36 necessary to run a system application. The application manager 16 retrieves the identified application objects 36 from the application object libraries 37 based on the virtual objects 35 in the object specification 68 and loads the objects 36 onto the allocated hardware resources 15 as indicated at 38.

Figure 3:
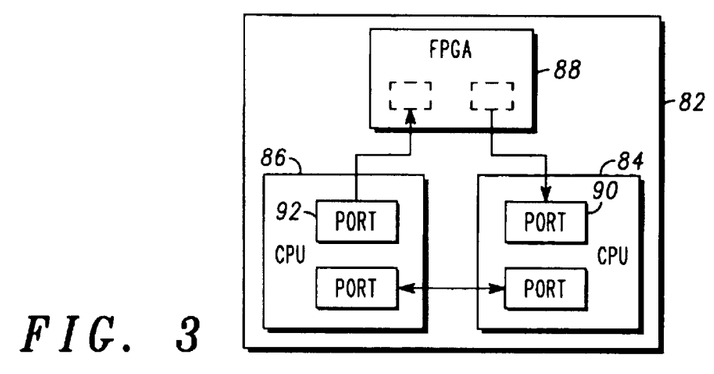
FIG. 3 is a block diagram of exemplary hardware resources with custom interconnects capable of being identified by the hardware resource identifier of the present invention.
Figure 4:
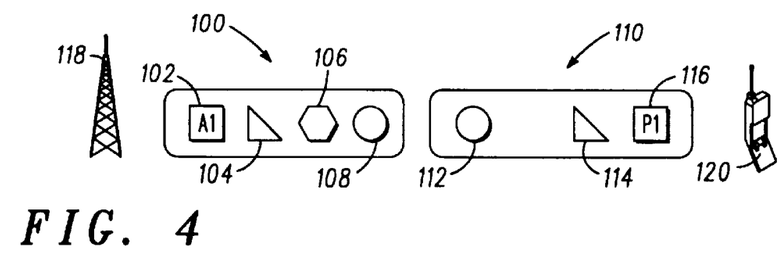
FIG. 4 is a block diagram of two exemplary hardware resource groups defined by the hardware resource identifier of the present invention.

Turning now to FIGS. 3 and 4, syntax used in the radio 10 and recognized by the hardware resource identifier 19 of the present invention as indicating resource allocation constraints will now be discussed. Specifically, syntax is used by application programmers to identify hardware resource constraints including hardware resource associations, hardware resource groups and resource group domains. Hardware resource association labels are found only in the files of the hardware specification 40 and the application specification 34, and can be used to differentiate otherwise ambiguous resources. For example, as shown in FIG. 3, a hardware resource module 82 includes two processors 84, 86 having identical internal characteristics (MIPS, ports, clock speed, RAM, OS, type, and the like). If the application objects to be executed require access to an FPGA 88, the hardware resource identifier 19 characterizes the interdependencies of the processors 84, 86 so that the choice among the processors 84, 86 by the hardware resource manager 18 is no longer arbitrary. Specifically, a port 90 on the processor 84 has a transmit connection to the FPGA 88, while a port 92 on the processor 86 has a receive connection with the FPGA 88. By applying an association label "fpga_tx" to the port 90 and an association label "fpga_rx" to the port 92, an application developer can explicitly request a processor with ports associated with FPGA transmit and receive connections. The association labels thus enable a resource to be specifically allocated and enables an application developer to tightly control hardware resource allocation by minimizing unknown resource allocations.

Hardware resource groups, on the other hand, are collections of interdependent hardware resources. For example, as shown in FIG. 4, an exemplary RF resource group 100 includes a collection of tightly coupled resources represented in the abstract by geometric shapes 102–108, and an exemplary baseband resource group 110 includes a collection of tightly coupled resources represented in the abstract by geometric shapes 112–116 (antenna 118 and handset 120 are not included in the respective resource groups 100, 110. As the open architecture of a system such as the radio 10 transforms to a less channelized platform, the number of resources within each of the resource groups, such as the groups 100, 110 can be reduced, thereby increasing overall system flexibility.

Figure 5:
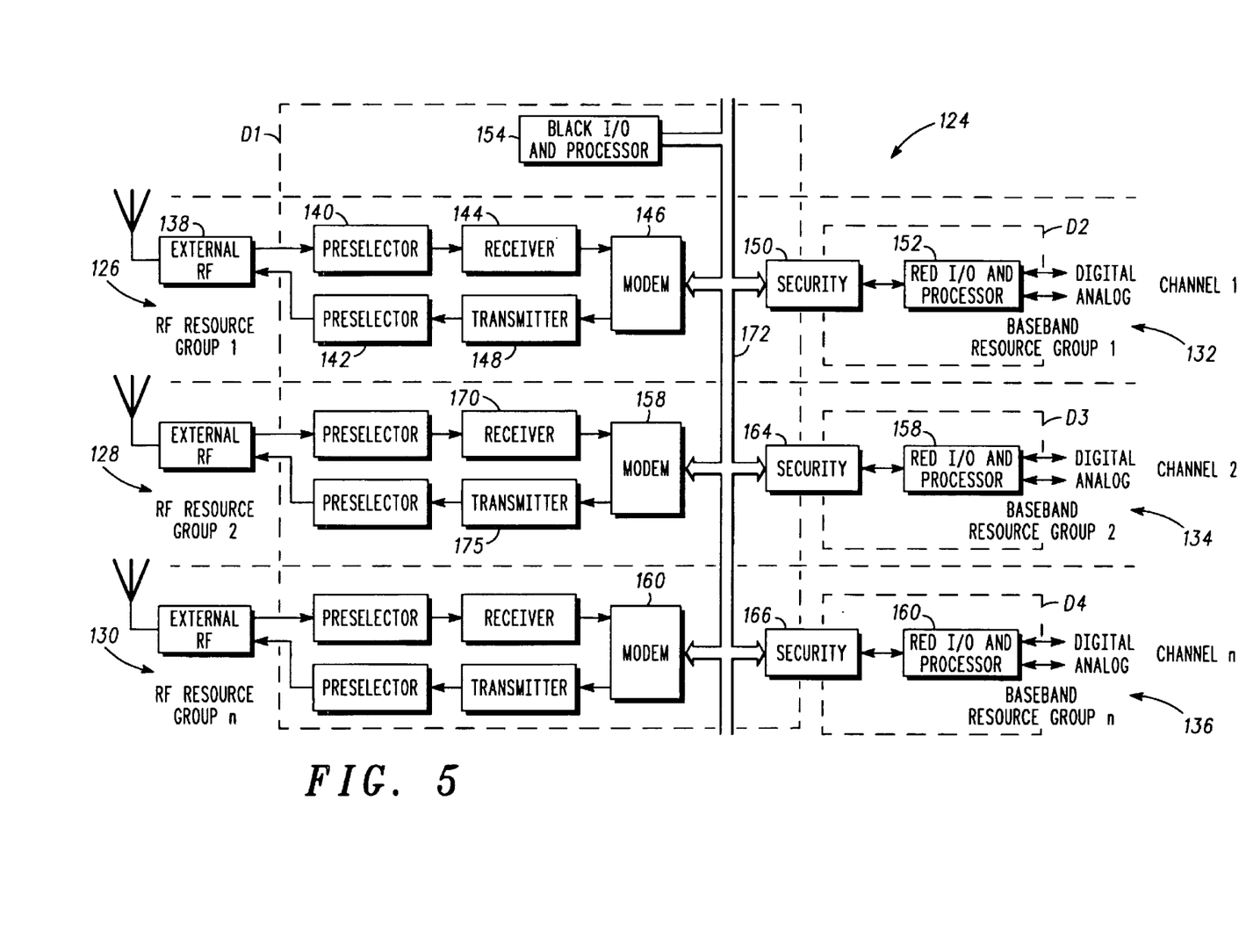
FIG. 5 is a hardware resource block diagram of an exemplary multi-channel communications system showing hardware resources that are allocated by the hardware resource identifier of the present invention in response to system application requirements.

Resource domains represent a collection of hardware resources having sufficient connectivity to enable software objects loaded onto the resources therein to transparently interact with each other via a shared communications bus. FIG. 5 is a detailed block diagram of the hardware resources of a partially channelized multi-channel software-defined communications system 124, such as the above-discussed WITS radio, that incorporates the hardware resource identifier 19 of the present invention. The communications system includes a scalable number of channels 1, 2, ... n, with the channels 1, 2, ... n including RF resource groups 126, 128, 130 and baseband resource groups 132, 134, 136, respectively. Referring to the RF resource group 126 and the baseband resource group 132 for the discussion purposes, each RF resource group has resources such as an external RF source 138, preselectors 140, 142, a receiver 144, a modem 146 and a transmitter 148, while each baseband resource group includes resources such as a security module 150 and a processor module 152.

Certain of the hardware resources, such as I/O processors 154 of domain D1 (indicated by dashed line box in FIG. 5), are shared by all channels, while other resources, such as I/O processors 152, 158, 160, of respective domains D2–D4 (indicated by dashed line boxes in FIG. 5) can only be accessed by resources such as security resource modules 150, 164, 166 within channels 1, 2, ... n, respectively. For example, a receiver module 170 in channel 2 cannot communicate with the modem module 146 in channel 1. In addition, while the modem modules 146, 158, 160 are all accessible from a security bus 172, the I/O processors 152, 158, 160 are only accessible through the respective security modules 150, 164, 166. Such low-level hardware resource interdependencies represent the hardware resource associations discussed above, and enable the hardware resource manager 18 to allocate system hardware resources in the most efficient manner possible.

Figure 6:
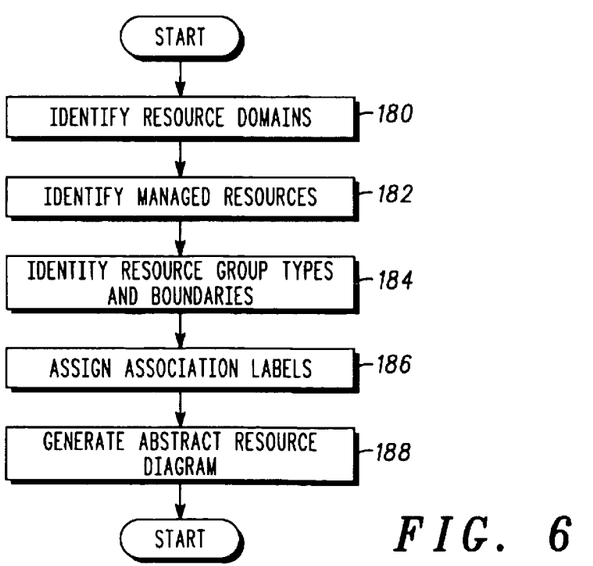
FIG. 6 is a flow diagram of the methodology used by the hardware resource identifier of the present invention to generate an abstract hardware resource diagram.
Figure 7:
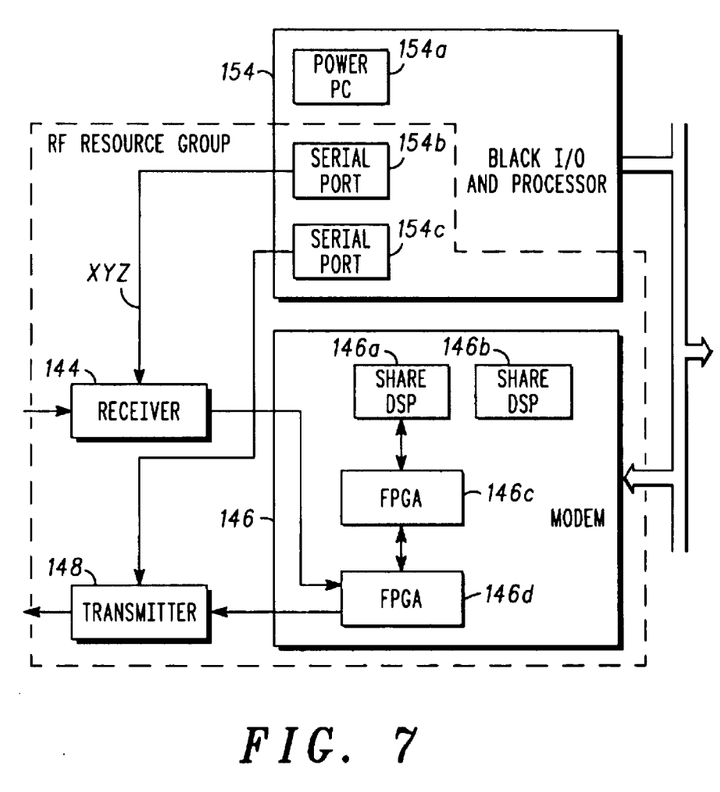
FIG. 7 is a block diagram showing interdependencies among hardware resources and resource group boundaries within the multi-channel communications system of FIG. 5.

Referring now to the flow diagram in FIG. 6 as well as FIGS. 5 and 7–10 for illustrative purposes, generation of the abstract resource diagram by the systems designer for use by the hardware resource identifier 19 of the present invention will now be discussed. At 180, resource domains, or boundaries, such as the domains D1–D4, are identified using a system block diagram generated by the systems designer, such as shown in FIG. 5. The diagram shown is for illustrative purposes only, as in practice the system block diagram will contain more detail than is contained in FIG. 5. At 182, all managed resources, which represent the lowest level of hardware resources that would be requested for an application, are explicitly tracked and identified. As shown in FIG. 7, such managed resources include, for example, a power PC 154a and serial ports 154b, 154c in the processor module 154 and Sharc DSPs 146a, 146b and FPGAs 146c, 146d in the modem module 146.

At 184, all resource group types and boundaries are identified. Specifically, any collection of highly coupled hardware resources is a good candidate to be identified as a resource group. Also, identical sets of hardware resources are identified as identical group types. For example, as shown in FIG. 5, all RF resource groups 126–130 are identified as the same type of hardware resource group. If a set of coupled resources differs in function from another set, then each of the two sets is identified as a different resource group type. The hardware identifier 19 will recognize the resource groups 126–130 as RF resource groups and the resource groups 132–136 as baseband resource groups to accurately represent system channeling and coupling. As a result of the resource groups 126–130 and 132–136 being identified as described above, the hardware resource manager 18 can subsequently combine any RF resource group with any baseband resource group when allocating hardware resources to support a system application.

In order for the resource group designations to be useful to the hardware resource manager, the hardware resource identifier 19 must identify the managed devices within the resource groups. For example, the hardware resources within the dashed box in FIG. 7 are identified by the hardware resource identifier as belonging to the RF resource group 126. Therefore, if an application specification requests tightly coupled resources, they can all be allocated from the same RF resource group, such as the resource group 126. A signal may then be input through the receiver 144, pass through the modem 146 and then be transmitted through the external RF 138 by the transmitter 148. Alternatively, if the communication application could process the signal by requesting a super-circuit that required, for example both of the RF resource groups 126, 128, the signal could, for example, be input through the receiver 144 of RF resource group 126, pass through the modem 146, and then pass through the modem 158 and be transmitted by a transmitter 175 of the RF resource group 128.

Figure 8:
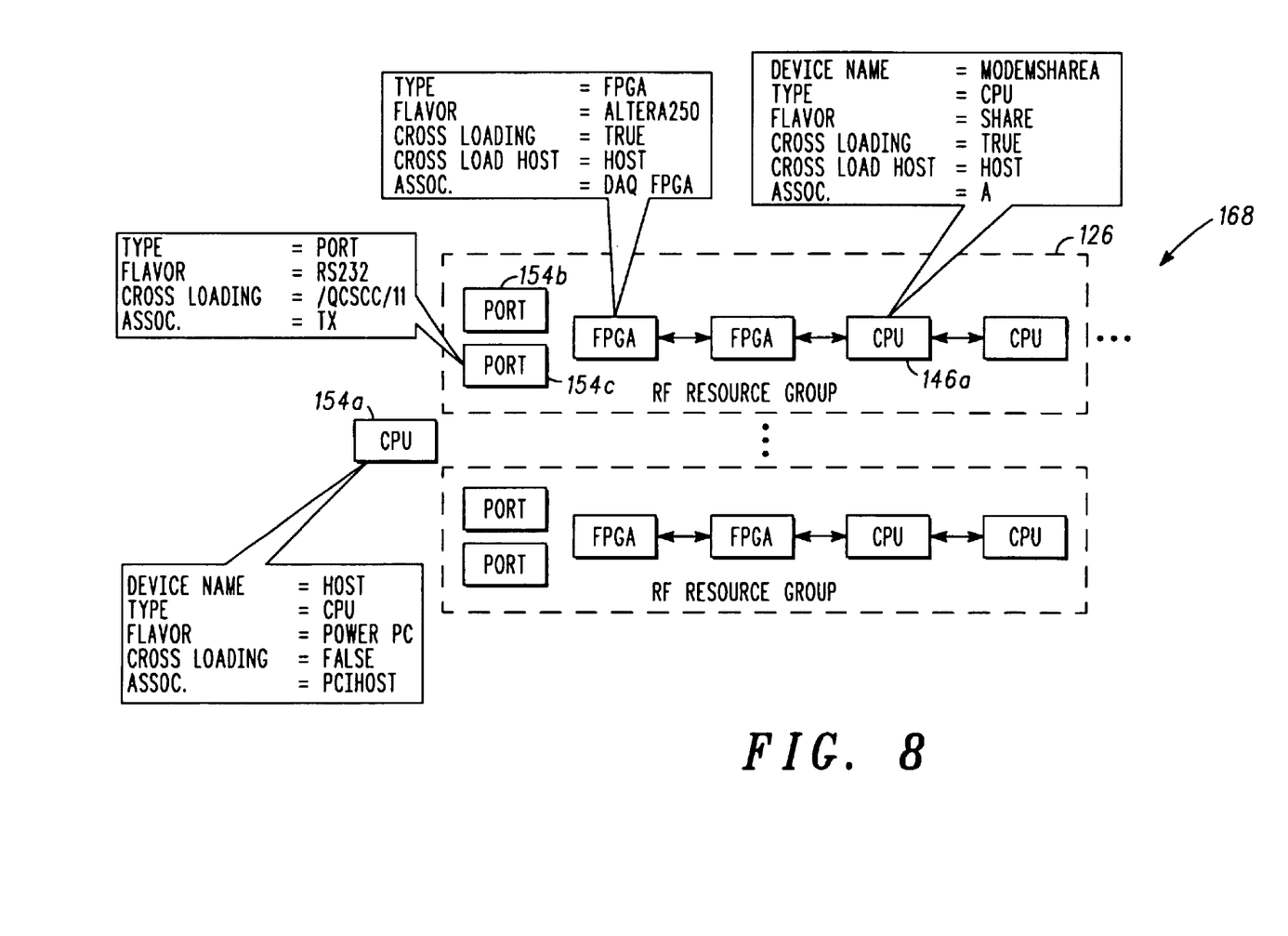
FIG. 8 is a block diagram of an abstract resource diagram, which is a graphical representation of the contents of the hardware specification of FIG. 1 as interpreted by the hardware resource identifier of the present invention.

At 186, association labels are assigned to all hardware resources to enable the hardware resource manager to better identify relationships among managed resources and external hardware resources such as interconnects between hardware components 144 and 154b represented by interconnect XYZ in FIG. 7. The assigned association labels also enable ambiguity to be removed between redundant hardware resources within the same resource group, and to characterize dedicated coupling, such as over the top or hardwire connections, between individual resources. For example, as shown in FIG. 8, an association label "pcihost" is assigned to the power PC processor 154a to indicate to all other processors within the domain D1 that the power PC processor 154a is the host of the PCI communications bus. In addition, the systems designer assigns the association label "tx" to the serial port 154c to differentiate the otherwise identical ports 154b, 154c by indicating the respective internal connectivity of the port 154c to the transmitter module 148 as shown in FIG. 7. Also, the systems designer assigns the association labels "A" to the Sharc processor 146a to differentiate the processors having otherwise identical functions by identifying that the Sharc processor 146a is wired with a dedicated internal communications bus to the FPGA 146c.

Next, at 188 the abstract resource diagram is generated to organize the available hardware resources into the above-discussed domains and resource groups. FIG. 8 shows an exemplary abstract representation 168 of a subset of managed device resource groups for the multi-channel radio shown in FIG. 5. Each device is characterized by a list of attributes and one or more assigned association labels assigned, although only certain of the attributes and association labels are shown for ease of illustration and explanation. For example, the attribute and association labels for the transmitter port 154c in the RF resource group 126 identifies the resource as a port type resource with an RS422 flavor at system address /qcScc/11 and with a "tx," or transmitter, association. Such information describes the hardware resources and their connectivity using an abstract resource notation. The information of the abstract resource diagram generated by the systems designer can be easily encoded into hardware resource specification files 40 to describe all of the managed hardware resources and underlying interdependencies to the hardware resource identifier 19.

Figure 9:
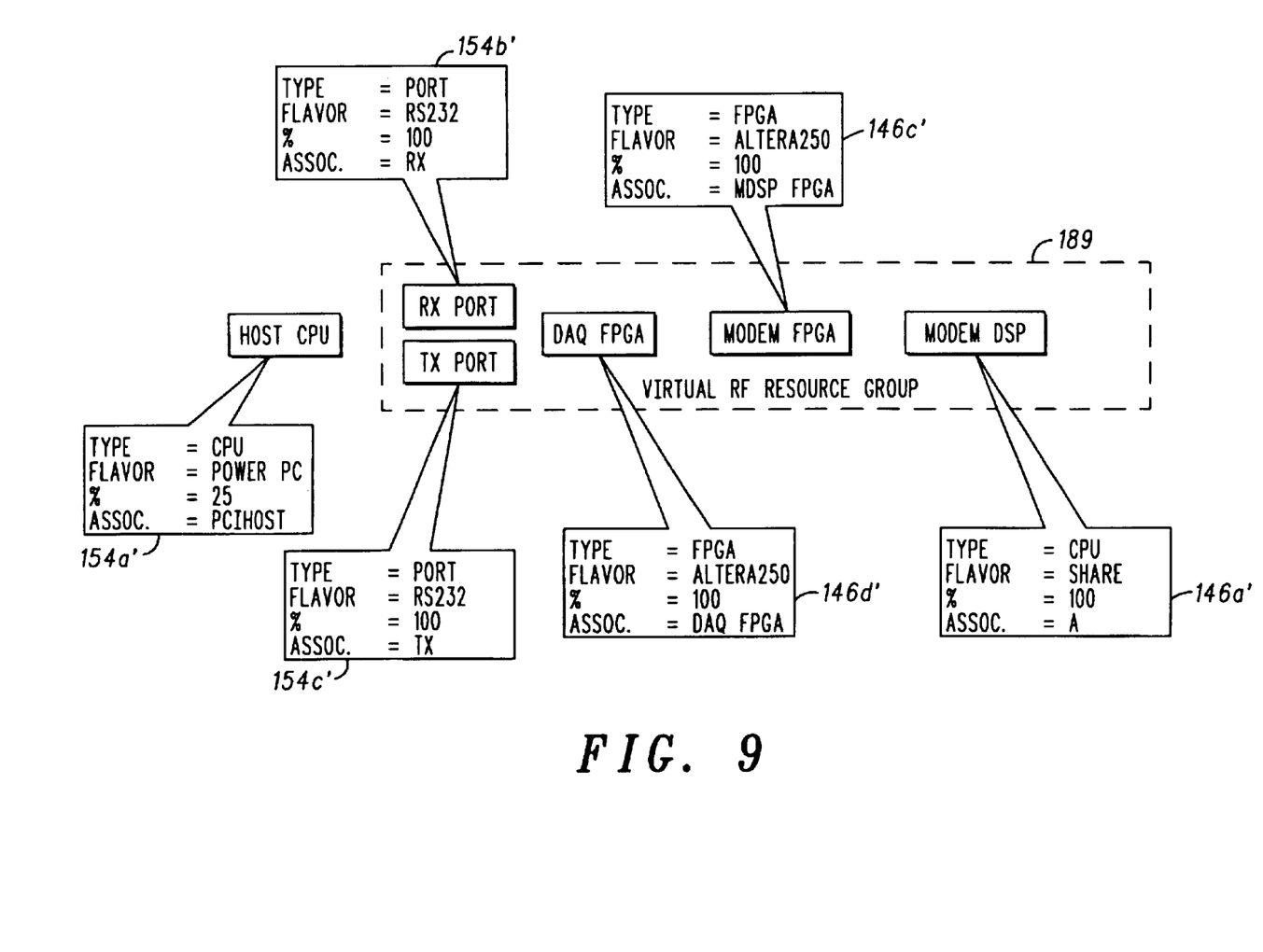
FIG. 9 is a block diagram of an abstract resource specification generated by an application of the multi-channel communications system in FIG. 5.
Figure 10:
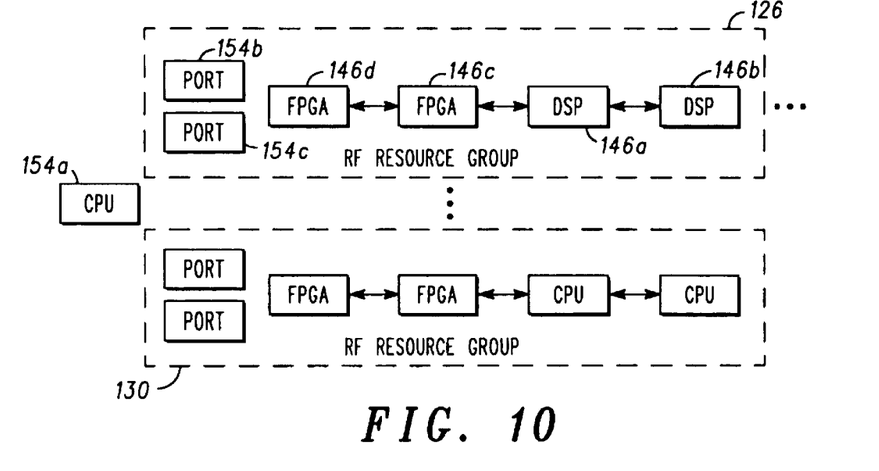
FIG. 10 is a block diagram showing resources allocated to a system application based on the abstract resource diagram shown in FIG. 8 as interpreted by the hardware resource identifier of the present invention.

Subsequent to generating the hardware resource diagram, the hardware resource specification 40, an application hardware resource specification 72 that is, for example, an ASCII file, is generated to describe the hardware resources required by an application. The manner in which the hardware resource specification is generated is similar to the above-described manner in which the abstract resource diagram is generated, except that not all attributes and resources assigned to the hardware resources need to be specified. FIG. 9 is an exemplary hardware resource specification generated in response to an application requiring the power PC processor 154a' as the PCI bus host, and an RF resource group including two serial RS422 ports 154b', 154c' associated with the receiver and the transmitter, two Altera 250 FPGAs 146c', 146d', and one Sharc processor 146a'. Further, the hardware specification 72 also dictates via the virtual RF resource group 189 that the application requires all resources except for the power PC to come from the same RF resource group. The hardware resource manager 18 then parses the definitions and constraints in the application hardware resource specification 72 and matches the resources required by the application with the best available resources. For example, if the resources shown in FIG. 10 represent all available hardware resources, the hardware resource manager 18 would allocate the available resources in the RF resource group 146 as well as the power PC processor 154a having sufficient connectivity, represented by the darkened boxes, to the application.

Figure 11:
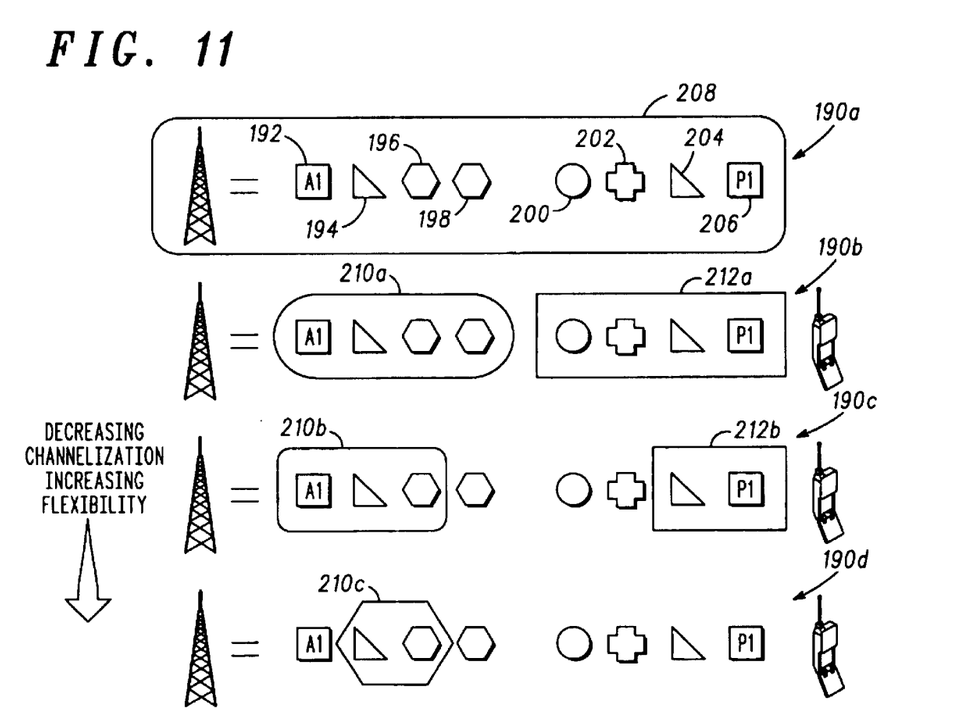
FIG. 11 is a block diagram that symbolically represents hardware resource groups of a multi-channel software-defined communications system in varying degrees of channelization.

The hardware resource identifier of the present invention is capable of identifying the resource constraints in a communication path even as the hardware resource topology of the path is modified without needing to be updated. For example, FIG. 11 illustrates the transformation of a communications path of a software-defined communications system from being fully channelized at 190a to being minimally channelized at 190b–190d as a result of the minimization of the size of the resource groups. More specifically, the communications path at 190a is fully channelized, as all hardware resources 192–206 are tightly coupled, or interdependent with one another, and therefore belong to the same resource group 208. When the communications path is transformed into the less channelized communications path 190b as group assignments and types are added or modified without recompiling the hardware resource manager software to reflect the reduced coupling between resources in group 210a and those in group 212b, the resource group 208 is broken into a separate RF resource group 210 and a baseband resource group 212. As more group assignments and types are added and/or modified and the communications path is transformed into that shown at 190c, the resource groups 210a, 212a are reduced further in size, resulting in modified resource groups 210b, 212b. The communications path 190c allows more resource allocation flexibility, as the hardware resource 198 becomes disassociated with the resource group 210, and the hardware resources 200, 202 become disassociated with the resource group 212. Finally, more group assignments and types are added and/or modified and the communications path is transformed into the path 190d, the resource group 210b is reduced further in size to the resource group 210c, and the resource group 212b is altogether eliminated. Nonetheless, the hardware resource identifier 19 of the present invention is capable of identifying resource constraints in all of the communication path configurations 190a–190d without needing to be modified as the hardware resource configurations are modified.

As should now be appreciated from the foregoing description, the hardware resource manager of the present invention concisely characterizes hardware dependencies in a scalable, distributed hardware intensive environment in which numerous software applications must concurrently interact with a large, and often changing, pool of interdependent hardware resources. In addition, the present invention is applicable to software development environments requiring highly deterministic hardware allocation for testing repeatability purposes. More generally, the present invention is applicable to both large and small open architecture software-defined systems requiring the characterization of hardware dependencies for evolving system resources having varying degrees of channelization.

Also, the present invention is applicable to highly complex super-communication circuits in which multiple channels of hardware resources are allocated to a single application performing higher level sub-channel, or, in other words, multiplexed communications path, management. Specifically, the hardware resource manager enables an application developer, through use of the resource group concept, to assign sub-channel objects to the same resource group within a larger application. Examples of such super-communication circuits include bridging and simulcast/receive communications topologies.

While the above description is of the preferred embodiment of the present invention, it should be appreciated that the invention may be modified, altered, or varied without deviating from the scope and fair meaning of the following claims.

What is claimed is:

1. A method of characterizing hardware resource dependencies in a multi-channel communications system, comprising:

identifying constraints and interdependencies among hardware resources based on both stored system and queried hardware resource characteristics; and generating an abstract resource specification based on the identifying of hardware resource constraints and interdependencies for use during hardware resource allocation to enable maximum preservation of most functional and least available hardware resources during hardware resource allocations;

wherein the identifying of constraints and interdependencies among hardware resources comprises identifying hardware resource groups and hardware resource group boundaries among the system hardware resources and assigning association labels to the system hardware resources to identify relationships, if any, between the system hardware resources and external hardware, to identify redundant resources within respective ones of the hardware resource groups, and to characterize dedicated coupling between individual ones of the system hardware resources.

2. The method of claim 1, wherein the identifying of constraints and interdependencies among hardware resources comprises identifying system communications domains that contain system hardware resources.

3. The method of claim 1, wherein the identifying of constraints and interdependencies among hardware resources comprises identifying managed hardware resources from among the system hardware resources.

4. A hardware resource identifier for a multi-channel communications system, comprising:

a hardware resource interdependency tracking device for recognizing constraints among available system hardware resources;

an association labeling device for assigning association labels to certain of the system hardware resources having constraints identified by the hardware resource interdependency tracking device;

a processor for interpreting an abstract resource specification identifying the available system hardware resources and the constraints associated therewith in a manner that enables maximum preservation of most functional and least available hardware resources during hardware resource allocation;

a hardware resource group and group boundary identifier for identifying hardware resource groups and group boundaries of the system hardware resources for use by the processor in interpreting the abstract resource specification; and an association labeler for assigning association labels to the system hardware resources to identify relationships, if any, between the system hardware resources and external hardware, to identify redundant hardware resources within respective ones of the hardware resource groups, and to characterize dedicated coupling between individual ones of the system hardware resources for use by the processor in interpreting the abstract resource specification.

5. The hardware resource identifier of claim 4, further comprising a resource domain identifier for differentiating domains of system hardware resources for use by the processor in interpreting the abstract resource specification.

6. The hardware resource identifier of claim 4, further comprising a managed hardware resource identifier for identifying managed hardware resources from among the system hardware resources for use by the processor in interpreting the abstract resource specification.

7. A method of characterizing a hardware topology of a software-defined communications system, comprising:

querying a static system hardware specification to identify hardware resource constraints and interdependencies;

performing a dynamic hardware resource investigation to identify hardware resource constraints and interdependencies in addition to those identified during the querying of a static system hardware specification; and interpreting an abstract hardware resource specification for use during hardware resource allocation to facilitate maximum preservation of most functional and least available hardware resources while still enabling application hardware resource needs to be met;

wherein the performing of a dynamic hardware resource investigation comprises identifying hardware resource groups and hardware resource group boundaries among system hardware resources and assigning association labels to system hardware resources to identify relationships, if any, between the system hardware resources and external hardware, to identify redundant resources within respective ones of the hardware resource groups, and to characterize dedicated coupling between individual ones of the system hardware resources.

8. The method of claim 7, wherein the performing of a dynamic hardware resource investigation comprises interpreting an abstract hardware resource description including virtual hardware resource objects which identify application hardware requirements.

9. The method of claim 7, wherein the performing of a dynamic hardware resource investigation comprises identifying system communications domains that contain system hardware resources.

10. The method of claim 7, wherein the performing of a dynamic hardware resource investigation comprises identifying system hardware resources that are managed hardware resources.

* * * * *